United States Patent [19]

Maloney

[11] 4,244,996

[45] Jan. 13, 1981

[54] PATCHWORK FABRIC CONFIGURATION AND PROCESS

[76] Inventor: Jennifer A. Maloney, 4800 Oxborough La., Bloomington, Minn. 55437

[21] Appl. No.: 8,489

[22] Filed: Feb. 2, 1979

[51] Int. Cl.[3] .................................................. B32B 7/08

[52] U.S. Cl. ...................................... 428/103; 112/423; 112/426; 112/427; 156/196; 428/187; 428/193; 428/194; 428/195; 428/196

[58] Field of Search ............... 428/121, 130, 176, 179, 428/195, 207, 103, 187, 193, 194, 196, 223; 150/32, 35, 28 R; 13/12, 13, 17 R; 2/275; 112/423, 424, 426, 427; 156/196

[56] References Cited

U.S. PATENT DOCUMENTS

| | | | |
|---|---|---|---|
| 1,328,623 | 1/1920 | Fry et al. . | |
| 1,371,755 | 3/1921 | Gilcrest . | |
| 2,065,388 | 12/1936 | Mitchell | 112/262 |
| 2,316,351 | 4/1943 | Miller . | |
| 2,371,318 | 3/1945 | Rosenfeld . | |
| 2,483,236 | 9/1949 | Rona . | |
| 3,617,425 | 11/1971 | White | 150/28 R X |
| 4,053,986 | 10/1977 | Axelrod | 33/12 X |

OTHER PUBLICATIONS

Luna, Benjamin C., *Upholstery: Refinishing and Restyling*, p. 162, ©1969.

Johnstone, James B., *Furniture Upholstery and Repair*, p. 39, ©1970.

*Primary Examiner*—Marion McCamish

*Attorney, Agent, or Firm*—Merchant, Gould, Smith, Edell, Welter & Schmidt

[57] ABSTRACT

A new process for making realistic appearing, simulated patchwork articles and a patchwork fabric configuration to be used therewith. In a preferred embodiment disclosed, a matrix of similarly sized, dimensionally aligned regions of design (14) is imprinted on a unitary piece of fabric (12). The regions of design (14) can be arranged in parallel rows and columns. The regions (14) are spaced from one another to define flexible fold regions (16) therebetween. The process includes steps of abutting facing edges (18) of adjacent regions (14) in a superimposed relationship and fixedly securing the regions (14) in this abutted configuration.

5 Claims, 5 Drawing Figures

FIG. 1
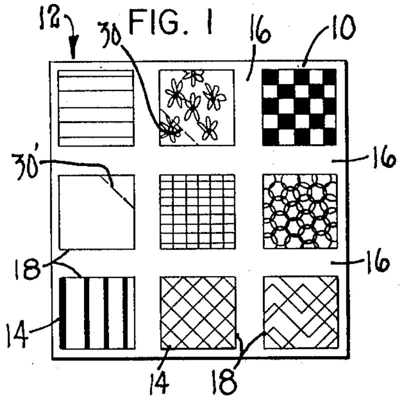
FIG. 2
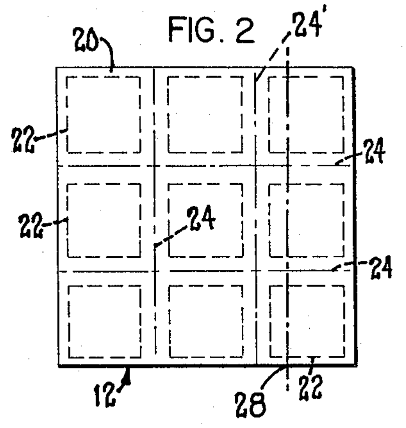
FIG. 3
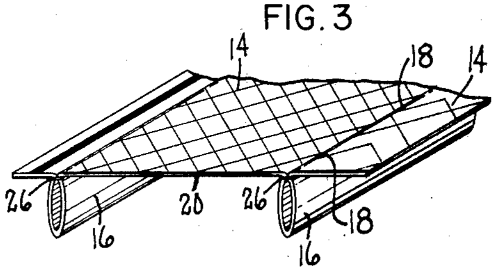
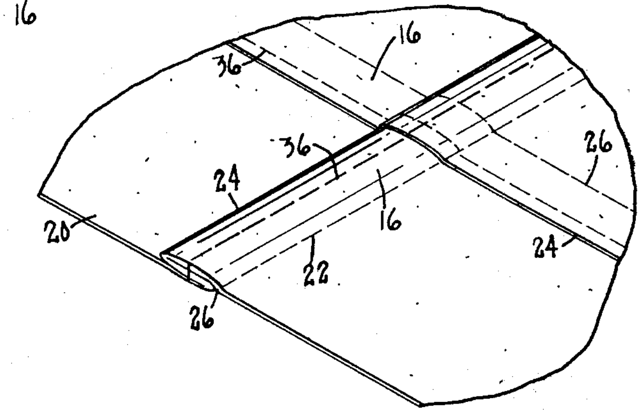
FIG. 5
FIG. 4
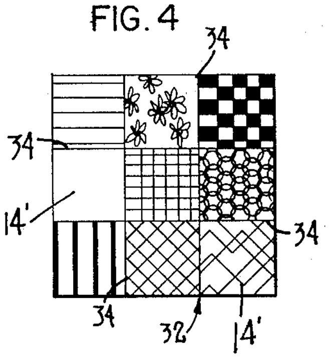

PATCHWORK FABRIC CONFIGURATION AND PROCESS

TECHNICAL FIELD

The invention of this application relates to the textile field. More specifically, it involves the art of making patchwork articles by use of the simulation process disclosed herein.

BACKGROUND OF PRIOR ART

The art of manufacturing patchwork-type articles has been known through the centuries. In the United States, patchwork quilts and other articles have been made and used since the colonial period. Nor has interest waned over the years.

Patchwork items remain in vogue even today. Various fabrics have been marketed on which patch designs and stitching, apparently joining these patches together, have been imprinted to simulate patchwork. Even these mock patchwork fabrics have met with some modicum of success illustrating, thereby, the general popularity of patchwork goods.

It has been much more desirable, however, to possess more realistic patchwork goods in which discrete patches are, in fact, stitched to one another. The added popularity of these non-simulated goods results from their authentic appearance and the greater value attributed to them because of the "handmade" aspect of the article.

The fact that making genuine patchwork articles does require the investment of a significant amount of time and skill frequently, however, serves to discourage many persons from making them themselves. And, often, because of the significant amount of time and skill involved in their making, genuine patchwork articles are priced so as to prohibit their purchase by many people.

Patchwork articles prove time consuming and expensive to produce because the artisan is required to manipulate many small components in effecting the transition from raw materials to finished product. However, the time and skill investment involved because of the need to process many small swatches of material is not the only drawback in manufacturing genuine patchwork articles. Since so many small swatches are used, they can easily become lost or misplaced. Additionally, a not insignificant amount of time becomes involved in cleaning up after working on the product.

The invention of this application is directed to both a manufactured article and a process to act upon that article to produce a finished patchwork product, authentic and realistic in appearance. Use of the article and the process overcome the deficiencies of the prior art limiting the making of "genuine-appearing" patchwork goods.

BRIEF SUMMARY OF THE INVENTION

The present invention is a patchwork fabric configuration, a process utilizing the fabric to make realistic appearing, simulated patchwork articles, and the product of the simulation process. It is the intent of the invention to facilitate the making of realistic appearing patchwork goods by eliminating the need for a multiplicity of small swatches of material. It follows that the invention is designed to decrease the requisite skill and time investment necessary to make such goods and to eliminate the disorder inherent in the use of many small pieces.

The process is worked upon a unitary piece of fabric which has imprinted thereon at least two defined regions. Typically, the defined regions would be of various dissimilar colors and designs to make the finished product more attractive.

The process is performed by abutting a straight line portion in one of the regions to a corresponding straight line portion in another region. That portion of the fabric originally lying between the straight line portions in the two regions is of a flexible nature in order to allow the abutment, and the entire flexible fold area, when abutment is effected, is gathered beneath the surface on which the design regions are imprinted. As a rule, the flexible characteristic of the fold areas is homogeneous throughout the piece of fabric, and the design regions are thereby provided with a similar degree of flexibility.

In order to retain the article in its patchwork configuration, the defined regions are secured in their abutting configuration. Affixation can be accomplished in a number of ways, although the patchwork art presently dictates affixation by sewing.

The process can be worked upon a piece of fabric on which are printed a multiplicity of similarly sized, dimensionally aligned spaced regions of design organized into a regular matrix of parallel rows and columns. When such a fabric is used, the straight line portions to be abutted can be facing edges of adjacent regions in the matrix.

In some embodiments, perimeter guides corresponding to the edges of each of the design regions can be imprinted on the underside of the fabric. Midway markers extending parallel to the perimeter guides can be imprinted on the underside of the fabric bisecting the area between the perimeter guides. Such a guide network can facilitate abutment of straight line portions in regions of design while viewing the underside of the fabric.

Applicant also claims as his invention the product of the process applied to the unitary piece of fabric. This finished product is configured with straight line portions in different defined regions secured together along an abutment defined by abutting the straight line portions together. The fold region of the embodiment is gathered on one side of the piece of fabric.

The invention is thus a new process and fabric to be used therewith for making realistic patchwork articles. The advantages of the invention will become apparent with reference to the accompanying drawings, detailed description of the invention and claims.

BRIEF DESCRIPTION OF THE DRAWINGS

FIG. 1 is a plan view of the first side of a piece of unprocessed fabric;

FIG. 2 is a plan view of the second side of the fabric illustrated in FIG. 1;

FIG. 3 is a fragmentary perspective view of a simulated patchwork article as disclosed by this application;

FIG. 4 is a plan view of the gridded surface of the fabric of FIG. 1 after operation of applicant's process invention; and FIG. 5 is a fragmentary perspective view of the underside of the embodiment illustrated in FIG. 4.

DETAILED DESCRIPTION OF THE INVENTION

Referring to the Figures, wherein like reference numerals denote like elements, FIG. 1 shows the first side 10 of a piece of fabric 12 which has a matrix of spaced regions of design 14 printed thereon. Although not an essential characteristic of the invention, FIG. 1 shows a fabric having nine similarly sized and dimensionally aligned squares forming the matrix. The invention, however, is by no means restricted to a fabric thusly configured. The embodiment illustrated in FIG. 1 was selected because of the ease it affords to disclosure of concepts of the invention.

Areas of the fabric between the regions of the design establish fold areas 16. These fold areas are flexible in nature. Flexibility of the design regions 14 is not essential, but, typically, the regions will be imprinted on a fabric whose flexibility is uniform throughout the segment.

The flexible nature of the fold areas 16 will permit abutting facing edges 18 of adjacent regions 14 of the design to one another. Because of the orderly arrangement of the design regions 14 in rows, abutting of the facing edges 18 of two adjacent regions will effectively render abutment of facing edges of other adjacent regions in the same rows.

FIG. 2 shows the second or underside 20 of the fabric 12 illustrated in FIG. 1. Guides 22 corresponding to the edges of each of the regions of design 14 imprinted on the first side 10 can be marked thereon. FIG. 2 also shows midway markers 24 which bisect the fold regions 16 intermediate the regions of design 14. The midway markers 24 shown extend the length of the fabric and parallel to facing edges 18 of adjacent design regions 14.

The aforedescribed fabric can be utilized in making realistic appearing, simulated patchwork articles. The person working the fabric may view the first side 10 and gather the flexible fold area 16 on the second side 20 or beneath the piece of fabric 12 so that the fold area 16 is completely obscured and edges 18 of the design regions 14 abut. The design regions 14 can then be fixedly adjoined along the abutting edges 18. Sewing the fabric in this configuration would be the typical method of affixiation, but it is intended that the scope of the invention be not limited to this method. FIG. 3 shows the worked fabric with the flexible fold region 16 gathered on the second side 20 with the abutting edges 18 of the design regions 14 fixedly attached to one another at 26.

Other methods of working the sheet of fabric in order to attain the finished simulated product can be utilized. The person working the fabric may view the second or underside 20 and gather the fold region 16 on that side so that the guides 22 defining facing edges 18 of the perimeters of adjacent regions 14 are superimposed.

A third possiblity would be to fold the entire piece of material along one of the midway markers 24 so that the first sides of segments of the fabric formed by the folding would face each other. Sewing or some other method of affixation could then be applied along the perimeter guides 22 proximate the fold. Since the midway markers 24 bisect the fold regions 16, perimeter guides 22 straddling the midway marker 24 at which folding is accomplished would be superimposed. By sewing along one perimeter guide 22 proximate the fold, affixation to a corresponding perimeter guide would therefore be effected. When the fabric 12 were unfolded, the fold region 16 would be fixedly maintained on the underside 20 of the material.

As will be seen by those of skill in the art, numerous modifications can be effected which do not exceed the scope of the invention. One variation which might be implemented if the third process described above were used, is to sew, not along the perimeter guides 22, but rather along an imaginary line as at 28 extending through the interiors of the design regions 14 and parallel to the perimeter guides 22 when the fabric is folded along midway marker 24'. Such a modification would have the effect of reducing the effective size of the design regions 14 on the first side 10 of the fabric 12.

Embodiments thus far described are those which would most logically be commercially exploited because of their ease in utilization. The invention, however, contemplates embodiments employing configurations other than a matrix of similarly sized and dimensionally aligned squares. The invention, in its broadest sense, can be accomplished by abutting a linear portion, such as at 30, in one defined region of a piece of fabric to a linear portion, as at 30', in a second defined region of the same piece of fabric. It is neither essential that the defined regions whose linear portions are abutted are adjacent regions, nor that they be of the same size and shape. As in embodiments in which the defined regions are organized into orderly patterns, the abutting linear portions can then be affixed along the abutment defined thereby.

FIG. 4 shows a gridded fabric surface 32 of a simulated patchwork article formed by the processing of the sheet of fabric shown in FIG. 1 in accordance with the steps herein defined. Grid regions 14', corresponding to the regions of design 14, are formed by a grid 34 defined by the abutting by the facing edges. The grid regions 14' are maintained in grid configuration by some means, typically sewing. The fold regions 16 extend from the edges 18 of adjacent grid regions 14' and are integrally formed therewith.

In order to make the finished simulated product more attractive, abutting grid regions 14' can be made of dissimilar colors and designs. Various striped, floral, checked, and other prints can be used.

In embodiments so far described herein, the looped fold areas 16 gathered on the second or underside 20 of the fabric 12 extend loosely therefrom. The simulated patchwork article can further be processed by flattening these looped fold areas 16 against the second side 20 of the fabric 12 in a planar fashion. The flattened fold area 16 can be maintained against the second side 20 of the fabric 12 by fixedly attaching it thereto. This flattening and affixing can most easily be accomplished by pivoting each fold region 16 against the second side 20 of the fabric 16 along a hinge established at 26 along the line of stitching. The fold area 16 can then be sewn, or affixed in another manner, to the second side 20 of the fabric 12 along a line 36 proximate the midway marker 24 at which the fabric 12 is folded.

Numerous characteristics and advantages of the invention have been set forth in the foregoing description. Although the invention has been described above in terms of specific embodiments and preferred constructions, it will, of course, be understood that the invention is defined in the appended claims, and many alternatives and modifications within the spirit and scope of the invention as defined by these claims will occur to those of skill in the art.

What is claimed is:

1. A simulated patchwork article comprising a flexible piece of fabric having at least two defined regions of various designs and colors, said fabric configured with a linear portion in one defined region abutting a linear portion in a second defined region, said linear portions separated on said fabric by a fold region and affixed together along their lengths with said fold region gathered on one side of said piece of fabric.

2. A simulated patchwork article, comprising:

a gridded fabric surface having grid regions of various dissimilar colors and designs;

means for maintaining said grid regions in grid configuration; and fold regions extending from facing edges of, and integrally formed with, adjacent grid regions, said fold regions gathered beneath said fabric surface.

3. A method for simulating patchwork articles, said method utilizing a unitary piece of flexible fabric having first and second sides, the first side having imprinted thereon at least two defined regions of various designs and colors, comprising the steps of:

(a) abutting a linear portion in one defined region to a linear portion in a second defined region so that a fold area, originally positioned intermediate said linear portions, is gathered on the second side of said fabric; and (b) fixedly adjoining said defined regions to one another, along an abutment defined by said abutting linear portions.

4. The method of claim 3 further comprising the steps of:

(c) flattening said fold area against the second side of said fabric in a planar fashion; and (d) fixedly attaching said flattened fold area to the second side of said fabric in a planar configuration.

5. A method for simulating patchwork articles, said method utilizing a unitary piece of flexible fabric having first and second sides, the first side having imprinted thereon at least two dimensionally aligned spaced squares of various designs and colors, facing edges of the squares being parallel, and the second side having imprinted thereon perimeter guides corresponding to the edges of each of the squares, the guides defining therebetween fold areas intermediate facing edges of adjacent squares, and midway markers extending parallel to the perimeter guides and bisecting the fold regions, comprising the steps of:

(a) folding the fabric along a midway marker with first sides of segments of the fabric defined by said folding facing each other and perimeter guides corresponding to facing edges of adjacent squares superimposed;

(b) sewing along the superimposed perimeter guides; and (c) repeating steps (a) and (b) for other fold areas.

* * * * *

UNITED STATES PATENT AND TRADEMARK OFFICE
CERTIFICATE OF CORRECTION

PATENT NO. : 4,244,996

DATED : Jan. 13, 1981

INVENTOR(S) : Jennifer A. Maloney

It is certified that error appears in the above-identified patent and that said Letters Patent are hereby corrected as shown below:

Column 3, line 46, "iation," should be --ation,--.

Signed and Sealed this

*Seventeenth* Day of *March 1981*

[SEAL]

*Attest:*

RENE D. TEGTMEYER

*Attesting Officer* *Acting Commissioner of Patents and Trademarks*